April 24, 1945.    W. J. READING    2,374,500
WASHER FOR EGGS OR THE LIKE
Filed Sept. 4, 1943    2 Sheets-Sheet 1

INVENTOR
WALTER J. READING
BY
Beau, Brooks, Buckley & Beau
ATTORNEYS

April 24, 1945. W. J. READING 2,374,500
WASHER FOR EGGS OR THE LIKE
Filed Sept. 4, 1943 2 Sheets-Sheet 2
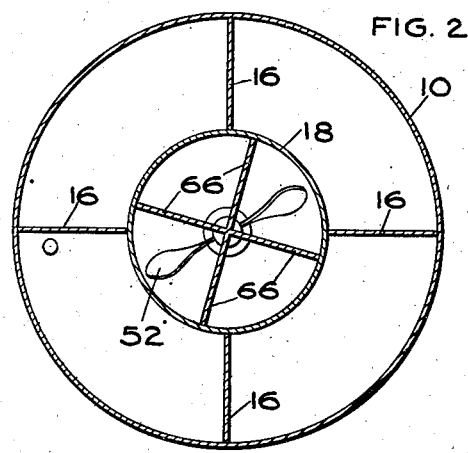
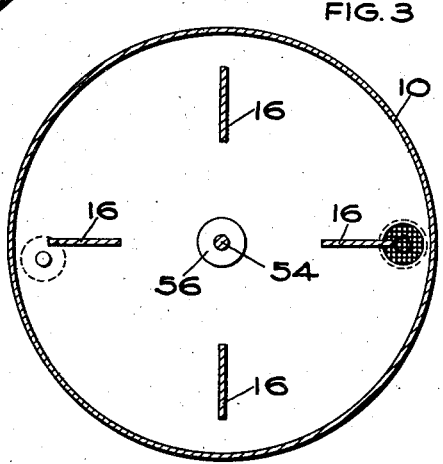
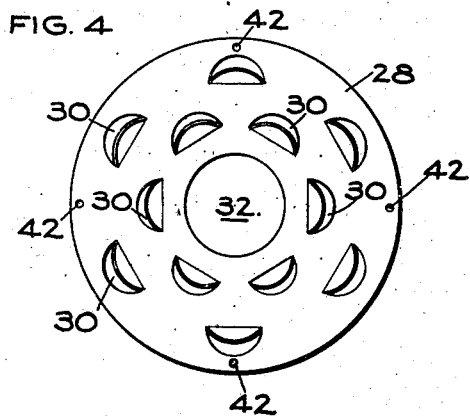
INVENTOR
WALTER J. READING
BY
Beau, Brooks, Buckley & Beau.
ATTORNEYS Patented Apr. 24, 1945

2,374,500

UNITED STATES PATENT OFFICE 2,374,500

WASHER FOR EGGS OR THE LIKE

Walter J. Reading, Buffalo, N. Y.

Application September 4, 1943, Serial No. 501,229

5 Claims. (Cl. 146—198)

This invention relates to egg washing devices, and has for its primary object the provision of a machine which is adapted to be used with improved convenience and facility by poultry farmers and egg dealers for cleaning their poultry egg produce prior to marketing the same. Another object of the invention is to provide an egg cleaning apparatus for the purpose described, which is adapted to operate to clean eggs or the like in improved manner. Other objects and advantages of the invention will appear from the specification hereinafter.

In the drawings:

Fig. 2 is a section taken along line II—II of Fig. 1;

Fig. 3 is a section taken along line III—III of Fig. 1; and

Fig. 4 is a top plan of the cover plate for the egg container member of the mechanism.

Figure 1:
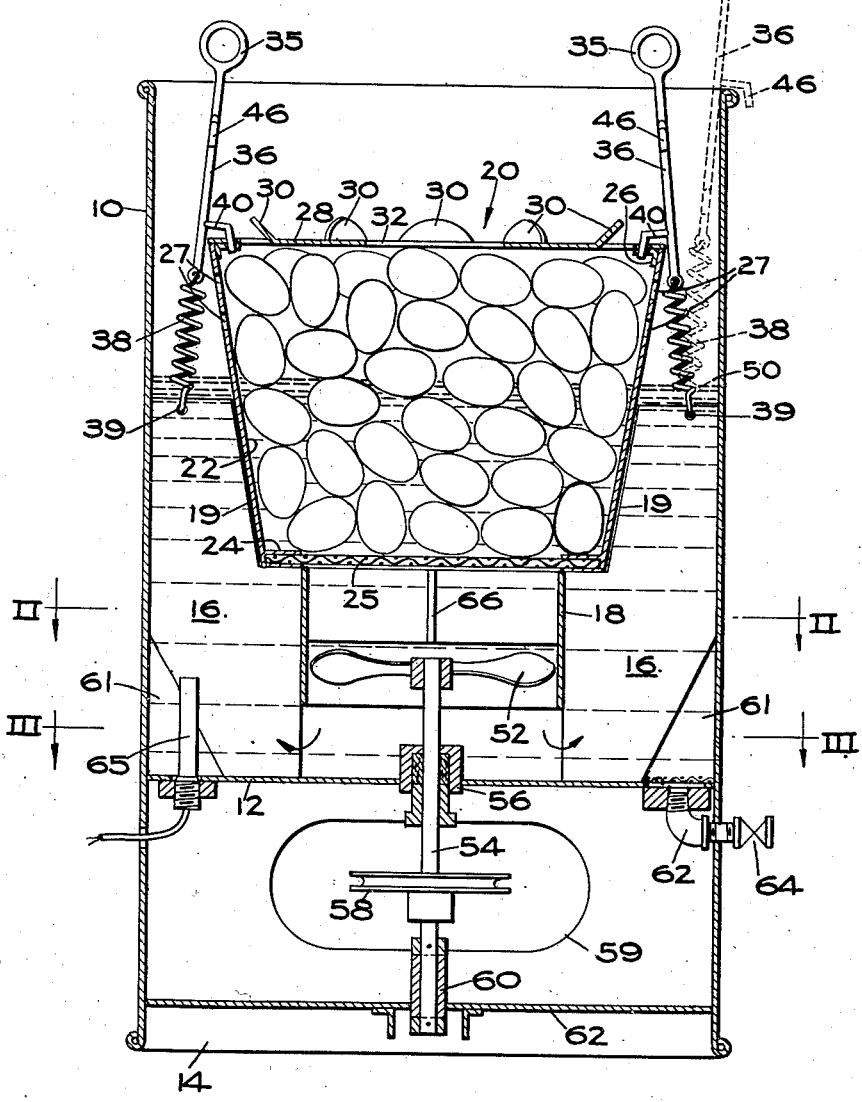
Fig. 1 is a vertical section through an egg washing unit of the invention, such as is adapted for use by poultry farmers or the like for cleaning daily produce.

The invention is illustrated in the form of a compact mechanical unit such as is particularly adapted for use by a small poultry farmer or the like in connection with the daily cleaning of egg produce preliminary to sending it to market. The unit comprises generally a cylindrical tank designated 10 which is open at its top and closed at its bottom by means of a liquid-tight bottom plate 12. The side wall structure of the tank 10 may extend, as shown, downwardly below the level of the bottom plate 12 so as to provide a foot structure 14 which supports the tank at a slight elevation above the floor or ground level. A plurality of vertical vanes 16 are mounted interiorly of the tank to be supported at their lower ends upon the bottom plate 12 and to rest at their outer edges against the wall of the tank. The vanes 16 may be conveniently connected to the tank wall structure, as by welding or any other suitable connection device. The vanes 16 extend radially of the interior of the tank from the outer wall 10 and inwardly thereof toward the center, but terminate short of the center in abutting relation against a vertical stack 18. The vanes may be conveniently connected to the stack 18 by welding or the like to provide a rigid integral structure. The upper end portions of the vanes 16 are cut away as indicated at 19 so as to be adapted to receive in seated relation thereupon the egg container member of the apparatus which is designated generally at 20. The egg container 20 is in the form of a basket adapted to carry a supply of poultry eggs or the like in nested relation therein; and the container 20 is thereby adapted to be supported by the vanes 16 in upright seated position centrally of the tank 10 and directly above the stack 18.

The container 20 is illustrated in the drawings as comprising a sheet metal wall structure 22 which is flanged at its bottom end 24 so as to engage a bottom member 25 formed of wire mesh material or the like. At its upper end the container wall 22 carries flange devices 26 whereby to support in detachable relation thereon a cover plate. If desired, the container may be perforated as shown at 27 in the upper side wall portions thereof to permit flow of cleaning fluid therethrough during operation of the device as will be explained hereinafter. As shown in Figs. 1 and 4, the cover plate 28 for the container is formed with a plurality of pressed-out portions 30 to provide open louvers. Also, the top plate 28 is centrally apertured as indicated at 32.

A plurality of positioning hooks 35 are provided for temporarily holding the container 20 down in seated position upon the vanes 16 during egg cleaning operations. As shown in Fig. 1, each hook includes a shank portion 36 connected at its lower end to a tension spring 38 which is in turn fixed at its lower end 39 to a corresponding one of the vanes 16. Each hook shank 36 carries an integrally extending finger 40 which is adapted to reach over the adjacent edge portion of the container 20 and to slip down into a perforated portion 42 of the cover plate 28 so as to be maintained thereby in holding position relative to the container 20. The hook and spring parts are so proportioned and arranged that the forces of the springs 38 are adapted to pull upon the hooks 36 in such manner as to normally maintain the finger portions 40 thereof in downwardly pulling relation against the container so as to hold the latter firmly in its seat upon the vanes 16. Each hook 35 also carries a second integrally extending catch finger 46, whereby the hooks are adapted to be pulled manually upwardly from the solid line positions thereof shown in Fig. 1 against the action of the springs 38 so as to withdraw the finger portions 40 from holding connection against the container 20. The hooks may thereupon be twisted and pulled laterally so as to engage the catch portions 46 thereof over the top rim of the tank 10, whereupon the hooks will be hung from the top rim of the tank in such position as to avoid interference with lifting the container 20 out of the tank 10.

Thus, subsequent to washing each batch of eggs the hooks 35 may be lifted upwardly and hung over the tank rim, whereupon the container 20 may be lifted bodily from the tank and the eggs removed therefrom and replaced by a new batch of eggs to be cleaned. The cover 28 may then be replaced, and the container 20 lowered into seated position within the tank, whereupon the hooks 35 may be lowered into holding relation upon the container 20, as shown in Fig. 1.

The tank 10 is arranged to contain a supply of cleaning liquid which will preferably be placed within the tank up to a level approximately as shown at 50, when the liquid is quiet. A liquid displacement device in the form of a propeller 52 is mounted within the stack 18 to be driven by a shaft 54 extending through a packed bearing 56 carried by the bottom plate 12. A sheave 58 is mounted upon the shaft 54 to be driven by a belt or other power transmission device extending from an electric motor or any other suitable power supply means which may be conveniently located exteriorly of the washer unit. For this purpose the leg wall structure of the tank may be perforated as at 59, and a bottom bearing 60 may be arranged in connection with the lower end of the drive shaft and to be supported by means of a bracket 62 extending from the tank leg structure.

Thus, it will be understood that the propeller 52 is adapted to be rotated upon energization of the power supply means referred to, whereupon the liquid within the stack 18 will be displaced by the propeller so as to be driven downwardly and then out through the space between the lower end of the stack 18 and the bottom plate 12 and thence upwardly between the vanes 16 and between the side wall of the tank 10 and the container 20. Such displacement of the liquid within the tank causes the level of liquid exteriorly of the container 20 to rise until the fluid flows over the top plate 28 and thence through the louvered apertures therein, and also through the side apertures 27, if such are provided, so as to cascade down through the batch of eggs disposed within the container. Inasmuch as the propeller 52 has by this time drawn the level of liquid interiorly of the container 20 down to the region of the bottom screen plate 25, the entire batch of eggs is now clear from the body of quiet liquid, and the cascading scouring movement of down-flowing liquid is enabled to carry on throughout the entire vertical extent of the batch of eggs within the container.

The cleaning liquid may comprise an aqueous solution of sodium hydroxide or lye in the form of an approximately 1% solution; or, any other suitable cleaning or bleaching solution may be employed in the machine of the invention. Preferably, the vanes 16 are cut away adjacent their lower end portions to provide open passageways as indicated at 61 behind each vane in the region just above the bottom plate 12. This permits some circulation of solution in horizontal directions in the region of the bottom plate 12, thereby preventing undue accumulation of sediments on the bottom plate in the region of the intersections of the vanes and the tank wall structure. However, the vane members 16 effectively prevent circulation of the solution in horizontal directions to any undesirable extent and guide the solution to circulate mainly in the vertical directions referred to hereinabove for the purpose of performing the cleaning process as outlined above.

A sediment drain conduit 62 may be provided in the bottom wall 12 as shown, and will be preferably arranged to be controlled by a stop cock 64. As shown at 65, a heating element in the form of an electric resistance device may be mounted to extend through a wall portion of the tank 10, whereby the cleaning solution within the tank may be heated to any desired degree for most efficient operation of the device. Also, I prefer to mount a plurality of vanes 66 interiorly of the stack 18, whereby the direction of liquid movement through the propeller 52 may be more effectively guided, and whereby to provide a firmer support for the container 20 when mounted in operative position.

It will be understood that, if desired, the direction of rotation of the propeller 52 may be reversed at will; and that the propeller may be caused to operate at any desired speed in order to obtain most effective cleaning of eggs; and that although only one form of the invention has been shown and described in detail, it will be apparent to those skilled in the art that the invention is not so limited but that various changes may be made therein without departing from the spirit of the invention or the scope of the appended claims.

I claim:

1. An egg washing device comprising, in combination, a tank, a vertical stack disposed centrally of said tank, vertical vane members disposed to extend radially from said stack into abutting connection with the side wall and bottom wall structure of said tank, an egg container demountably seated upon the upper end portions of said stack and of said vanes and comprising an imperforate side wall structure and a perforate bottom wall and a detachable top cover, said top cover having portions thereof pressed outwardly to provide baffled openings leading therethrough, detachable hook means carried by said vane members and adapted to be hooked into connection with said top cover so as to pull downwardly thereon whereby to firmly seat said container upon said stack, and fluid displacement means disposed interiorly of said stack and adapted to cause liquid disposed therein to circulate therefrom into the spaces between said vane members and between said container and tank walls so as to flow through the interior of said container.

2. A washing device comprising, in combination, a tank, a vertical stack disposed centrally of said tank, a produce container demountably seated upon the upper end portions of said stack and comprising an imperforate side wall structure and a perforate bottom wall and a detachable top cover, said top cover having portions thereof pressed outwardly to provide baffled openings leading therethrough, detachable hook means carried by said tank and adapted to be hooked into connection with said top cover so as to pull downwardly thereon whereby to firmly seat said container upon said stack, and fluid displacement means disposed interiorly of said stack and adapted to cause liquid disposed therein to circulate therefrom into the spaces between said container and tank walls so as to flow through the interior of said container.

3. An egg washing device comprising, in combination, a tank, a vertical stack disposed centrally of said tank, vertical vane members disposed to extend radially from said stack into abutting connection with the side wall and bottom wall structure of said tank, an egg container demountably seated upon the upper end portions of said stack and comprising an imperforate side wall structure and a perforate bottom wall and a detachable top cover, said top cover having openings leading therethrough, spring-operated detachable hook means carried by said tank and adapted to be hooked into connection with said top cover so as to pull downwardly thereon whereby to firmly seat said container upon said stack, and fluid displacement means disposed interiorly of said tank and adapted to cause liquid disposed therein to circulate through the spaces between said vane members and between said container and tank walls so as to flow through the interior of said container.

4. An egg washing device comprising, in combination, a tank, a vertical stack disposed centrally of said tank, an egg container demountably seated upon the upper end portions of said stack and comprising an imperforate side wall structure and a perforate bottom wall and a detachable top cover, said top cover having openings leading therethrough, detachable hook means carried by said device and adapted to be hooked into connection with said top cover so as to pull downwardly thereon whereby to firmly seat said container upon said stack, and fluid displacement means disposed interiorly of said tank and adapted to cause liquid disposed therein to circulate between said container and tank walls so as to flow through the interior of said container.

5. An egg washing device comprising, in combination, a tank, a vertical stack disposed centrally of said tank, vertical vane members disposed to extend radially from said stack into abutting connection with the side wall and bottom wall structure of said tank, an egg container demountably seated upon the upper end portions of said stack and said vanes and comprising an imperforate side wall structure and a perforate bottom wall and a detachable top cover, said top cover having portions thereof pressed outwardly to provide baffled openings leading therethrough, detachable hook means connected to said vane members by spring devices and having fingers adapted to be hooked into connection with said top cover so as to pull downwardly thereon whereby to firmly seat said container upon said stack, said hook means also having other finger devices enabling said hooks to be hung upon the rim of said tank to avoid interfering with removal of said container from said tank, and fluid displacement means disposed interiorly of said stack and adapted to cause liquid disposed therein to circulate downwardly and then upwardly through the spaces between said vane members and between said container and tank walls so as to be delivered onto the top cover of said container for cascading downwardly through said baffled openings and through the egg load for egg scouring purposes.

WALTER J. READING.